March 12, 1963　　　T. G. JUNGERSEN　　　3,081,122
RELEASE APPARATUS

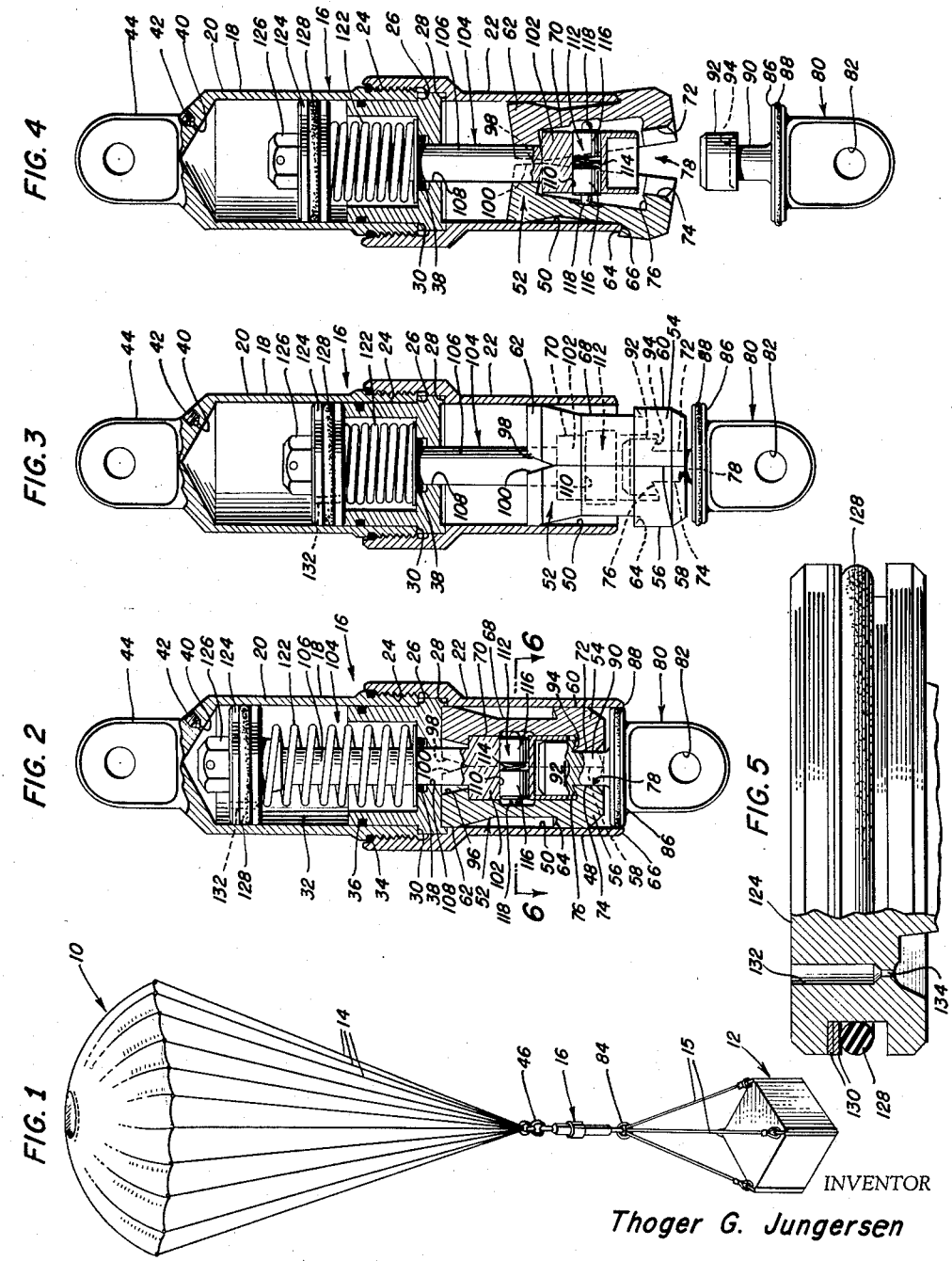

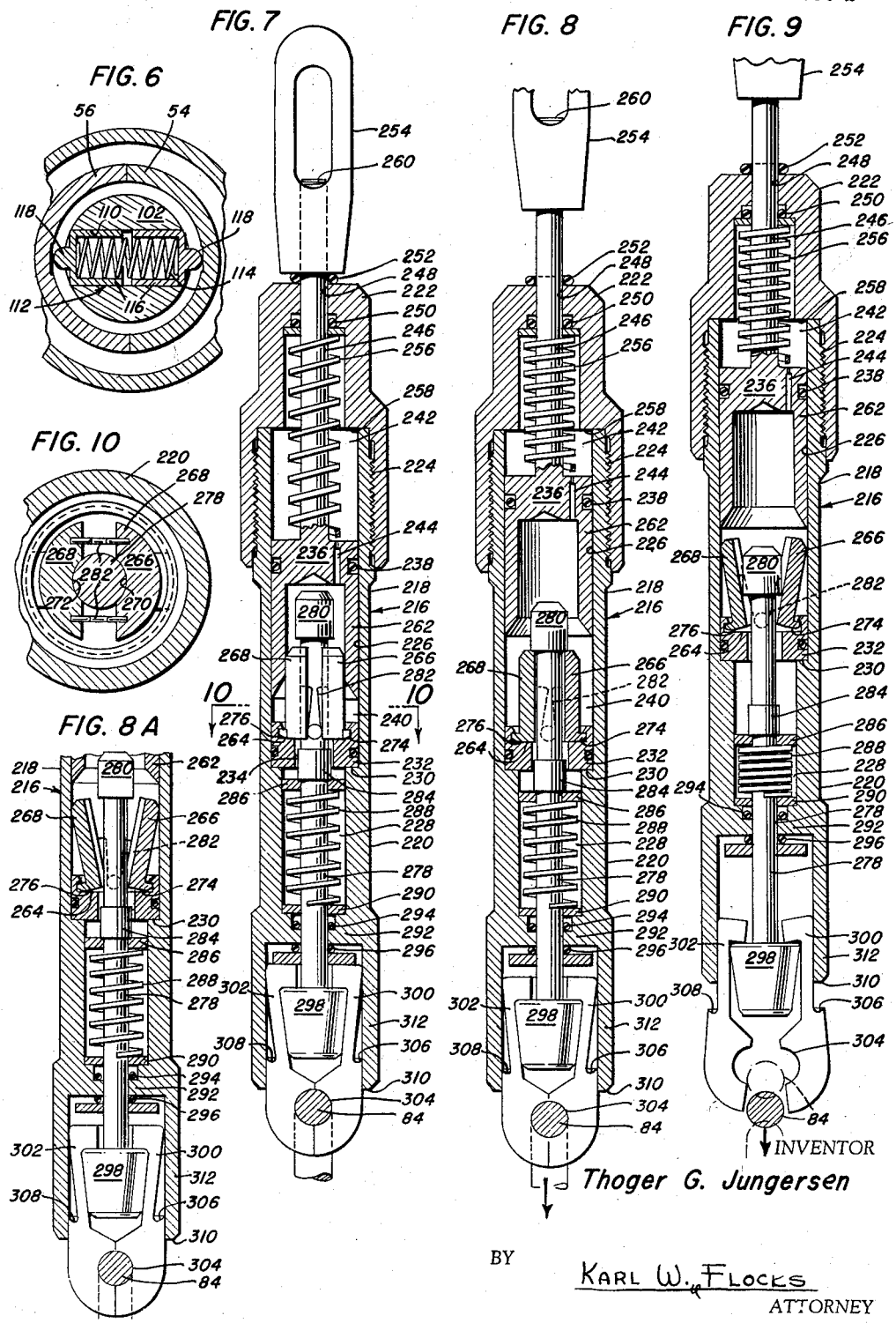

Filed May 31, 1961　　　　　　　　　　　3 Sheets-Sheet 3

INVENTOR
*Thoger G. Jungersen*

BY　*Karl W. Flocks*
　　　　　　　ATTORNEY

United States Patent Office 3,081,122
Patented Mar. 12, 1963

3,081,122
RELEASE APPARATUS
Thoger G. Jungersen, Summit, N.J., assignor to Thoger G. Jungersen, Jr., Summit, N.J.
Filed May 31, 1961, Ser. No. 113,798
13 Claims. (Cl. 294—83)

This invention relates generally to coupling or lock assemblies and more particularly to a coupling assembly adapted to disconnect a cargo load or individual from a parachute, life boat from davit support cables, etc., the coupling or lock assemblies automatically disconnecting or permitting disconnection when the load on support cables or parachute shrouds is substantially relieved upon contact with the ground, water, etc.

At first it may seem quite simple to produce a reliable and practical parachute or life boat release which is the subject matter of this invention. The prior art has indicated that many attempts have been made. However, no one has succeeded in producing such an urgently needed reliable device, although thousands of human lives and millions of dollars worth of urgently needed medical and military equipment and supplies have been lost or destroyed in the past, due to the absence of a practical and satisfactory device of the character involved.

Separable release or coupling assemblies for use in suspending cargo loads from parachutes, life boats from davits, etc. have been known in the art. However, due to the particular problems involved, the prior art couplings or releases have generally proved to be extremely unreliable or impractical for the purpose intended. In addition to the primary requirement of such devices, i.e. that of maintaining a positive coupling between a parachute and a load while the load is air-borne and yet swiftly releasing the load when the load engages the ground, an additional critical requirement is that during initial opening or bouncing of a parachute, or suspended load, there will be maintained a positive locking or coupling between the suspending device, i.e. the parachute and the cargo which is to be subsequently disengaged from the parachute shrouds or support cables after the load has been released.

Further, it is generally a desirable prerequisite that a cargo, after it has reached the ground, be readily and immediately detached from the coupling device with a minimum or no manipulation or physical effort. This element is particularly important during Army maneuvers, for example, for personnel, paratroopers, or for air-borne cargo, such as jeeps, ammunition, tanks, etc., which must be immediately disassociated from the parachute by which such cargo is dropped to avoid permitting the cargo or personnel to be dragged and damaged on the ground by strong winds for example.

A primary object of this invention is to provide a practical coupling or release assembly which affords positive coupling, prevents disengagement of the coupling during initial shock of opening of the parachute, etc., for example, and permits quick or automatic uncoupling after a load has been landed.

Another object of the subject invention is to provide a durable and practical release coupling assembly of the character involved which automatically de-couples upon reduction or relief of the loading on the coupling below a predetermined minimum.

Still another object of the invention is to provide a releasable coupling assembly which includes load-responsive timing means which, for a predetermined increment of time, maintains the releasable coupling in a securely locked condition and thereafter, due to the tension to which the coupling is subjected, permits the assembly to move to an automatic de-coupling condition which will permit a load to be immediately released when load conditions on the coupling have been reduced to a predetermined amount.

In order to attain the foregoing objects, the principal feature of the releasable coupling assembly generally involves means whereby a cargo or the like may be coupled to suspending means, the coupling assembly including means whereby the coupling is retained in a locked condition for a predetermined increment of time, the increment of time being determined by the load conditions to which the coupling is subjected, and further including means for orienting the locking means of the coupling to an automatic release condition whereby ready and substantially automatic separation of a cargo from the coupling is permitted.

Another and extremely important object of the invention is to produce a durable and reliable cargo and personnel release which will operate in any position, i.e., horizontal, inverted, etc., without any adjustments or mental requirements on the part of personnel, etc.

Thus, a further and more specific object and proven accomplishment of this invention is to produce a reliable and durable automatic release, which will not be affected by moisture or dirt when it is completely closed and which will work under most any condition, in any position, even if the load and the parachute should be disposed in opposite directions and which will release automatically when the load tension is relieved upon contact with the land or water, and which is as a unit fool-proof as to obviate the necessity for adjustments, or mental requirements of an operator.

A further specific object is to produce a coupling which may be inverted while securely locked during initial shocks or bouncing of a load when suddenly suspended by the coupling and after a time interval which will release such load when the load tension is materially relieved.

And yet another object of the subject invention is to provide a reliable parachute release which will be securely coupled or locked during initial descent of a load with the parachute, but upon the load's contact with the ground surface or water, will remain engaged but will permit ready disengagement on a predetermined tension imposed by a strong wind which might otherwise drag and damage the load, personnel, etc.

Numerous other objects or uses of the subject invention will become very evident to anyone skilled in the art upon reference to the accompanying description taken in conjunction with the accompanying drawings, wherein:

FIG. 1 is a perspective view showing cargo being suspended from a parachute by means of a releasable coupling assembly of the invention;

FIG. 2 is an enlarged vertical section of one embodiment of the novel release coupling assembly, including a hydraulic cylinder with a suitable metering fluid and showing the relative position of the parts prior to the parachute opening and wherein the parts are retained in a position to prevent accidental de-coupling;

Figure 11:
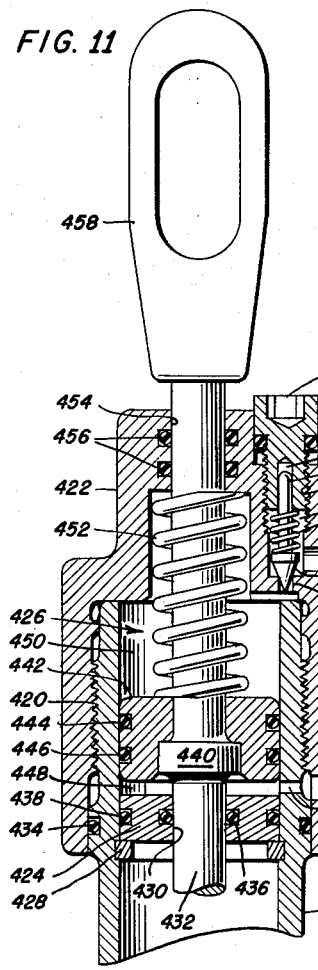
Figure 12:
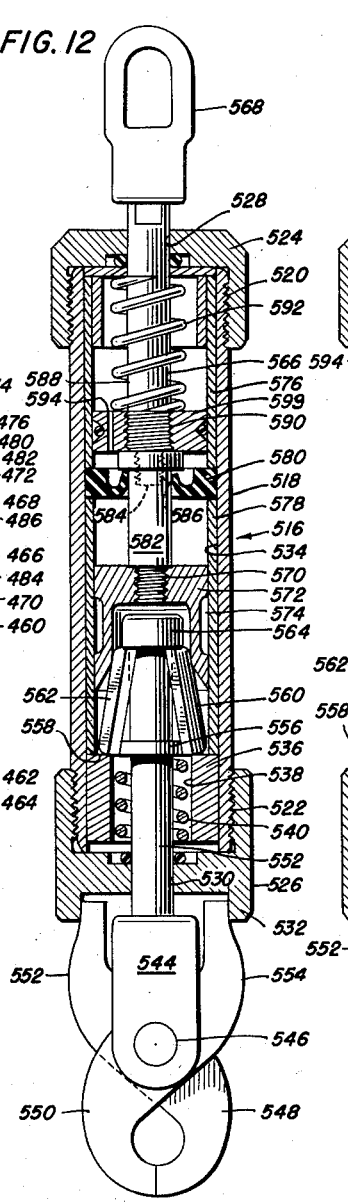
Figure 13:
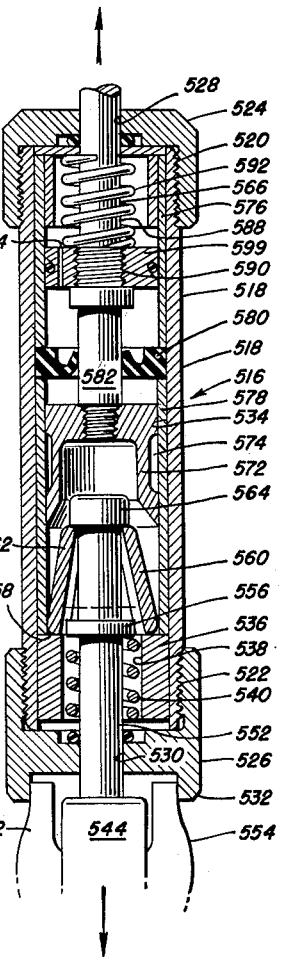

FIG. 3 is a view similar to FIG. 2 showing an intermediate position of the parts of the coupling assembly after a predetermined time interval has elapsed after the parachute's opening and the hydraulic metering fluid has passed through a metering orifice to permit the locking means to be in a position for substantial automatic de-coupling after the load on the coupling is substantially decreased when it engages the ground, water, etc.;

FIG. 4 is a view similar to FIGS. 2 and 3 showing the relative position of the parts whereby automatic de-coupling has taken place after the load tension is removed from the coupling, i.e. as the cargo reaches the ground, water, etc.;

FIG. 5 is an enlarged elevation of a suitable hydraulic timing element used in FIGS. 2–4, portions being broken away for illustrating the metering orifice;

FIG. 6 is an enlarged horizontal section taken substantially on the plane of line 6—6 of FIG. 2;

FIG. 7 is a vertical section of another embodiment of the novel release coupling assembly, showing the parts in substantially the same relative position as those in FIG. 2, i.e. at the moment when a cargo and closed parachute are initially discharged into the air;

FIG. 8 is a view similar to FIG. 7 showing the relative position of the parts shortly after the parachute is open and is suspended in the air, this position being comparable to that shown in FIG. 3;

FIG. 8A is a fragmentary view similar to FIGS. 7 and 8 illustrating the relative position of the parts when the cargo or personnel load tension is relieved on the coupling assembly when coming into engagement with the ground, for example, showing the manner in which the lower locking jaws of the coupling assembly are still maintained in a locked condition;

FIG. 9 is a view similar to FIGS. 7–8A showing the relative position of the parts permitting release of the cargo due to excessive drag by wind and showing a compressed spring which, due to the tension imposed by the wind on the parachute, permits the lock jaws to be opened, this view being comparable to that of FIG. 4 of the embodiment of FIGS. 1–6;

FIG. 10 is an enlarged horizontal section taken substantially on the plane of line 10—10 of FIG. 7;

FIG. 11 is an enlarged, fragmentary section of the upper portion of another embodiment of the novel releasable coupling assembly showing means whereby an adjustable fluid metering orifice may be incorporated in the releasable coupling assemblies for controlling the predetermined interval by which premature decoupling is positively prevented;

FIG. 12 is a vertical section of a still further embodiment of the novel releasable coupling assembly showing the initial position of the parts similar to FIGS. 2 and 7;

FIG. 13 is a view similar to FIG. 12 showing the second or intermediate position of the parts after a cargo is airborne and the parts are disposed in an automatic release position.

Referring to the drawings in detail, and first referring to FIGS. 1–6, an open parachute is indicated generally at 10 and is utilized as the means of discharging cargo 12 from an aircraft, the cargo being attached to the parachute shroud lines 14 by support cables 15 through a releasable coupling assembly indicated generally at 16.

When the folded parachute, cargo, and coupling assembly are initially discharged from the aircraft, they fall together as a unit and relatively little tension is applied to opposite ends of the coupling assembly. The folded parachute is generally caused to open by means of a static line trailing from the aircraft, and when the parachute suddenly snaps open to the condition shown in FIG. 1, the cargo will be moving at a higher rate of speed than the parachute. Until the shroud lines 14 and support cables 15 are fully extended, the coupling assembly 16 is subjected to a substantial shock, i.e. maximum tension is applied to the coupling at this time. It is during this interval or period when premature release of the coupling assembly must be prevented. After the initial shocks, the parachute and cargo will descend together quietly in the air. As shown in FIG. 1, the weight of the cargo will cause the metering oil to by-pass the piston and the coupling assembly parts to move into the condition shown in FIG. 3 of the drawings until the cargo 12 engages the ground surface whereafter automatic separation of the locking parts is caused to occur, as shown in FIG. 4 of the drawings.

The coupling assembly 16 comprises a cylinder or casing 18 which includes axially aligned upper and lower sections 20 and 22 which are threadedly connected at 24. Retained between the end 26 of the upper part 20 and an annular shoulder 28 of the lower part 22, is a cylindrical partition element 30 which defines a hydraulic fluid chamber 32 in the cylinder or casing 20. Suitable seals, such as O-rings or the like, are provided at 34, 36 and 38 to maintain the fluid in the cylinder chamber 32. In order to fill the chamber 32, the upper casing part 20 includes a filler opening 40, sealed by a plug element 42.

The casing portion 20 includes at its upper end an integral eye portion 44 to have fixed thereto a connecting ring 46, see FIG. 1, secured to the shroud lines 14 of the parachute.

The lower housing portion 22 includes a cylindrical jaw-guard 48 having an uninterrupted bore portion 50. Reciprocably received in the bore 50 is a latch or jaw assembly indicated generally at 52 which includes a pair of normally juxtaposed, substantially semicylindrical similarly conformed jaws 54 and 56, which are engaged at their mating longitudinal edges as indicated at 58. The jaws 54 and 56 have formed thereon a continuous lower guide shoulder 60 and upper guide shoulder 62, the diameter of which substantially conforms to the bore 50 of the jaw-guard 48. When the parts are disposed in the position shown in FIG. 2, the jaw-guard 48 will prevent separation of the jaws 54 and 56.

The shoulder 60 is undercut at 64 to form an annular and inwardly converging groove to engage over the lower tapered edge 66 of the jaw-guard 48, see FIG. 4. The jaws 54 and 56 include a reduced or undercut portion 68 above the groove 64 to permit outward movement of the jaws 54 and 56 as seen in FIG. 4. The reduced diameter portion 68 angles outwardly into intersecting relationship with the shoulder 62.

The jaws 54 and 56 form therein an axial and internal recess 70, and the respective jaws have opposed, longitudinally extended grooves 72 and 74 formed on the inner surfaces thereof. The lower surface of the recess 70 comprises an upwardly angled shoulder or groove portion 76 which is intersected by an axially opening bore 78.

Indicated generally at 80 is a separable eye element which will receive in the transverse aperture portion 82 a connecting ring 84 to which the cables 15 are secured, see FIG. 1. The element 80 includes an intermediate, transverse disc portion 86 which will incorporate in the outer periphery thereof an O-ring 88 which prevents moisture or dirt from entering into the jaw-guard 48. Extending upwardly from the disc 86 is a cylindrical stem 90 terminating in a substantially cylindrical abutment portion 92 having an undercut inwardly angled lip or groove portion 94 which will conform to and be engaged on the angular shoulder portion 76 of the jaws 54 and 56 when the parts are disposed in the conditions shown in FIGS. 2 and 3. The jaws 54, 56 have communicating with the recess 70 at their upper ends an inverted upwardly diverging bore portion 96, see FIG. 1, and as seen in FIGS. 2–4 the respective jaw elements 54 and 56 have at the upper end of the mating longitudinal edges angular shoulder portions 98 and 100, respectively. The shoulder portions 98 and 100 will permit the outward lateral movement of the jaws 54 and 56 to the position shown in FIG. 4, after the load is relieved, whereby the eye element 80 may be separated from the jaws.

Receiving within the cylindrical recess 70 formed by the jaws 54, 56 is a cylindrical support portion 102 of a timing or metering piston indicated generally at 104. The support portion 102 is integrally connected to a piston rod 106 which extends through the upwardly diverging bore portion 96 and a transverse aperture 108 in the fluid chamber forming wall element 30. The seal 38 engages about the piston rod 106 to maintain fluid in the chamber 32.

Fixed in a transverse bore 110 within the support element 102, see FIGS. 2, 4 and 6, is a jaw-biasing spring assembly indicated generally at 112. The spring assembly 112 comprises an internal coil spring 114 having circumposed about opposite ends thereof cylindrical shell elements 116 including terminal tip portions 118 which engage in the longitudinal grooves 72 and 74 of the jaws 54, 56 respectively. The spring assembly 112 tends to urge the jaws 54, 56 apart; however, the jaw guard 48 prevents this from occurring until the cargo 12 reaches the ground. It will be noted that the stem 90 is of sufficient length to permit the eye element 80 to move upward slightly within the recess 70 of the jaws 54, 56, thus permitting the jaws to spread apart as seen in FIG. 4 and lock itself in an open position. While the cargo is suspended in the air as shown in the condition shown in FIGS. 1 and 3 of the drawings, the undercut shoulder 94 of the eye element 80 will be in engagement on the angular shoulder portion 76 formed on the jaws 54, 56 at the lower portion of the recess 70 and thus accidental separation of the eye element 80 from the jaws is prevented while it is under tension. Additionally, the portion 102 of the metering piston assembly 104 has depending therefrom a downwardly opening sleeve 120 which receives the portion 92 of the eye element 80 therein, this substantially insuring the guiding axial separation of the eye element 80 from the jaws 54, 56.

The piston rod 106 has circumposed thereabout, in the fluid chamber 32, a coil spring 122 which reacts against the wall forming element 30 and a transverse, orificed, metering piston 124 is suitably secured on the upper end of the piston rod 106 by means of a securing nut 126. The piston 124 has circumposed about the outer periphery thereof in a suitable annular groove an O-ring seal 128 which sealingly engages the inner peripheral surface of the fluid chamber 32. In conjunction with the O-ring 128, a plurality of lip seals 130 may be disposed thereabove, see FIG. 5, in order to insure proper sealing of fluid in the variable volume chambers on opposite sides of the piston 124. Further referring to FIG. 5, the piston 124 has extending transversely therethrough a passage 132 including a metering orifice 134 which is calculated to permit movement of the piston 124 in the fluid chamber 32 at an appropriate predetermined rate of speed, i.e. this determining the time interval that it takes the piston 124 to move from the position shown in FIG. 2 to that shown in FIG. 3.

*Operation*

As previously mentioned above, the parachute will be closed, and the releasable coupling assembly 16 will be disposed in the condition shown in FIG. 2. During the initial shock or shocks of the parachute opening, the parts will still be disposed in the condition shown in FIG. 2 wherein the fluid in the chamber 32 below the piston 124 will lock or prevent sudden downward movement of the piston during the initial shock of the parachute opening and when maximum tension is applied to the coupling 16.

After the parachute is opened, and the cargo 12 is descending quietly with the parachute, the weight of the cargo in the casing 18 will cause the piston 124 to move to the position shown in FIG. 3. Previous to the disposition of the parts in this position, jaws 54, 56 will be lockingly engaged on the portion 92 of the eye element 80 and the spring assembly 112 will be acting against the jaws 54, 56. When the piston 124 moves to the position shown in FIG. 3, the jaw guard 48 will no longer engage the lower shoulder portion 60 of the jaws 54, 56; however, the weight of the cargo 12 on the eye element 80, causing engagement of the inclined recess 76 and undercut recess 94, will prevent axial separation of the eye element 80 from the jaws 54 and 56.

When the cargo 12 engages the ground surface, the tension on the coupling 16 will be relieved, the element 92 will no longer be pulled tight against the inclined shoulder 76 of the jaws 54, 56 and this relief of tension will permit the spring assembly 112 to urge the jaws 54, 56 apart; and at this time the spring 122 in the fluid chamber 32 will tend to move the piston 124 upwardly. When this occurs, the angular shoulder 64 of the jaws 54, 56 will engage on the lower edge 66 of the jaw guard 48 and the parts will be separated and disposed to the condition shown in FIG. 4, due to the fact that the undercut head 92 of the separable eye element 80 is held in the cylindrical jaw-guard 48 in the center of the sleeve portion 120, and there is caused positive disengagement of the head 92 from the angular shoulder portion 76 of the jaws 54, 56.

Thus, there has been disclosed and described what appears to be the first really practical and dependable releasable coupling assembly which positively prevents separation of the coupling parts during the initial shocks of parachute opening and likewise permits, automatic, dependable separation of the coupling parts when the cargo reaches the ground regardless of the orientation of the coupling assembly.

Referring to FIGS. 7–10, there is shown another embodiment of the novel coupling assembly indicated generally at 17, this embodiment releasing the parachute after the load has reached the ground, and provided the wind is so strong that it would tend to drag the cargo along with the parachute. The coupling assembly 216 includes an elongated tubular casing 218 including a lower casing part 220 and an upper casing part 222 which are connected together by means of cooperating threaded portions 224.

The lower casing part 220 includes an axial bore portion 226 communicating with a reduced diameter portion 228 forming a shoulder 230. Seated on the shoulder 230 is a transverse abutment or support element 232 including an axial bore 234. Reciprocably received for axial movement in the bore 226 is a metering piston 236 including a peripheral seal 238 engageable with the bore 226 and defining lower and upper of variable volume of fluid chambers 240 and 242 on opposite sides thereof. The piston 236 includes a transverse metering orifice 244 therethrough which permits fluid to move therethrough and accordingly times the movement of the piston in the bore 226. The piston 236 includes an integral upwardly extending axial rod 246 extending through an axial aperture 248 in the upper end of the casing part 222. Rod 248 has circumposed thereabout suitable seals 250 and 252 for preventing leakage of fluid in the chamber 242. Connected to the upper end of the rod 246 is a suitable connecting eye 254 for connection to the ring 46 of the parachute shroud line 14. Circumposed about the rod 246 is a compression spring 256 which normally urges the piston 236 downwardly to the normal or initial position shown in FIG. 7.

Without describing additional structure, it will be observed that the piston 236 is normally positioned away from the upper end 258 of the chamber portion 242. The connecting eye 254 is threadedly engaged at 260 on the upper end of the rod 246 for the purpose of adjusting the length of travel of the piston 236. When tension is supplied to the connecting eye 254 the metering orifice 244 will permit fluid contained in the chamber 242 to be metered therethrough at a predetermined rate of flow. However, during the initial shock of the parachute opening, or lifeboat being lowered from the davits of a ship, the fluid disposed in the chamber 242 will block rapid or sudden movement of the piston 236 upwardly and thus prevent premature or accidental release of the locking structure subsequently to be described.

The piston 236 includes a depending cylindrical skirt 262 which overlies and is spaced from the transverse abutment element 232. The abutment element 232 includes an upper annular seat 264 upon which is supported a pair of opposed locking jaws 266 and 268. The jaws 266 and 268 include longitudinally extending opposed grooves 270 and 272, see FIG. 10, and include at their lower portions laterally projecting feet having arcuate, relieved corners 274 and 276, respectively, which permit the locking jaws to pivot laterally and outwardly as seen in FIG. 9, for example. Extending axially of the casing part 220 and between the arcuate grooves 270 and 272 of the locking jaws is an elongated rod 278 which terminates in an upper cylindrical abutment portion 280 disposed above the upper ends of the locking jaws 266 and 268. Suitable biasing means such as hairpin springs 282 are interposed between opposed surfaces of the locking jaws 266 and 268 to normally urge them apart and out of the path of travel of the cylindrical abutment element 280, this condition being shown in FIG. 9.

The rod 278 includes an intermediate cylindrical guide portion 284 received within the axial aperture 234 of the element 232. Circumposed about the rod 278 below the portion 284 is an abutment ring or washer 286 which is engaged by a coil spring 288 circumposed about the rod 278. A second abutment washer 290 may be disposed at the lower portion of the bore 228 for engagement with the lower end of the compression or coil spring 288.

The lower casing part 220 includes an axially apertured transverse wall 292 through which the rod 278 extends. Suitable seals 294 and 296 are provided about the rod 278 to prevent leakage of fluid. The rod 278 terminates at its lower end in an inverted, truncated cone-like abutment element 298 which has circumposed thereabout a pair of separable jaws 300 and 302. The jaws combine to form a transverse aperture 304 engageable with a connecting ring 84. The jaws 300, 302 include lateral shoulder portions 306 and 308, respectively, which will engage on the lower edge 310 of a depending skirt portion 312 of the lower casing part 220.

*Operation*

When the parachute and cargo are discharged from an aircraft, the coupling assembly parts are disposed in the condition shown in FIG. 7. The cylinder skirt 262 will be circumposed about the locking jaws 266, 268 to prevent decoupling during the initial shock of the parachute opening. After the parachute is opened, and the cargo is suspended, the weight of the cargo will cause the compression spring 256 to be compressed, FIG. 8, and the piston 236 will move to the upper end 258 of the upper casing part 222. The speed of movement, i.e., the interval of time involved for the movement of the piston, is determined by the metering orifice 244.

After the peripheral skirt 262 is moved upwardly to the position shown in FIG. 8, the abutment portion 280 of the rod 278 frictionally engages the upper ends of the locking jaws 266, 268 and prevents the same from separating. The springs 282 will attempt to move the jaws 266, 268 outwardly away from the abutment element 280. However, this will not occur while the cargo is suspended in the air by the coupling assembly.

When the cargo reaches the ground, the tension on the ring 84 will be relieved, and the spring 288, which was slightly compressed while the cargo was suspended (note the relative position of the portion 284 in FIGS. 7 and 8) will cause the rod 278 to move upwardly a slight amount. When this occurs, the springs 282 will immediately urge the jaws 266, 268 apart in the manner shown in FIG. 9. However, as seen in FIG. 8A, it will be noted that the jaws 300, 302 will still be disposed in the condition shown in FIG. 8 due to the expansion of spring 288. In this manner, the parachute can be salvaged since the jaws 300, 302 will not be separated from the casing as is the connecting element 80 of the embodiment shown in FIGS. 2–4. When it is desired to separate the cargo from the coupling assembly, tension is supplied to the ring 84 in the manner indicated in FIG. 9; the spring 288 is compressed, thus permitting the jaws 300, 302 to move downwardly out of the lower end of the peripheral skirt 312 of the lower casing part 220. The separation of the jaws 300, 302 results in the grooves 306 and 308 of the jaws to be in substantial alignment with the lower end portion 310 of the lower casing part and thus these grooves will engage on the lower edge to maintain the jaws 300, 302 in their open or spaced condition.

Referring to FIG. 11, there is disclosed means for adjusting the rate of flow of fluid between opposite sides of the variable volume chambers defined by the pistons in a fluid chamber. This expedient can be incorporated in any of the previously disclosed embodiments and will accordingly permit the predetermined interval of time to be regulated.

An upper casing part is indicated generally at 418 and has secured to the upper threaded portion 420 a cap element 422. Formed in the casing part 418 by means of a transverse wall element 424 is a fluid chamber 426. The wall element 424 is retained in position by a lock ring 428 and includes an axial bore or aperture 430 through which a rod 432 extends and suitable seals 434, 436 and 438 are provided. Circumposed about an intermediate abutment portion 440 of the rod 432 is a piston element 442 having peripheral seals 444, 446. The piston element 442 defines on opposite sides thereof lower and upper variable volume fluid chambers 448, 450, respectively. The rod 432 has circumposed thereabout a compression spring 452 and extends through an upper axial bore 454 of the cap 422. Suitable seals 456 are provided about the rod 432 at the axial aperture 454. The rod 432 has secured to the upper end thereof a connecting eye 458 for connection to the shroud ring 456 of the parachute.

The cap 422 includes a passage portion 460 having a lateral leg 462 communicating with a port 464 communicating with the lower variable volume chamber 448. The upper end of the passage 460 communicates through a lateral leg 466 with a metering chamber 468 connected by a port 470 to the upper variable volume chamber 450. Accommodated in an upper threaded portion 472 of the metering chamber 468 is an adjustable screw 474 which is suitably sealed at 476 to prevent fluid leakage. The upper end of the screw 474 may include a socket 478 to accommodate an Allen wrench. The screw 474 includes an axial downwardly opening bore 480 accommodating the stem portion 482 of a conical metering or valve pin 484. Circumposed about the stem 482 is a compression spring 486 which urges the metering pin into seated relationship with respect to the upper end of the port 470.

When tension is applied to the connecting eye 458, the piston 442 will attempt to move upwardly with the rod 432, the flow of fluid through the port 470 being controlled by the metering pin 484, this being determined by the amount of pressure applied by the spring 486, this pressure being controlled by adjustment of the screw 474.

Referring to FIGS. 12–13, another embodiment of the releasable coupling assembly is indicated generally at 516. The releasable coupling assembly 516 includes an elongated cylindrical casing 518 having secured to upper and lower threaded portions 520 and 522 cap elements 524 and 526, respectively. The cap element 524 includes an axial aperture 528, and the cap element 526 includes an axial aperture 530 and a lower peripheral skirt 532. In this embodiment of the releasable coupling assembly, salvaging of the parachute after the cargo has reached the ground is permitted as in the releasable coupling assembly of FIGS. 7–10.

The casing 518 includes an axial bore 534 formed by axial sleeves and has disposed at the lower end thereof a tubular abutment collar 536. The collar 536 incorporates an enlarged axial bore 538 in which is disposed a coil spring 540. The spring 540 is circumposed about an intermediate portion of a rod element 542 which extends through the axial aperture 530 of the lower cap element 526 and has fixed thereto a clevis portion 544. Fixed on a transverse pivot shaft 546 of the clevis 544 are opposed pivotal retaining jaws 548, 550 which include reverse bend upper end portions 552, 554, respectively, which terminate within the peripheral skirt 532 and are normally retained from separation or pivotal movement about the pivot shaft 456 by the peripheral skirt 532.

The rod element 542 includes an intermediate integral abutment collar 556 which engages the upper end of the coil spring 540 and which may be pulled through the axial bore 538 of the abutment collar 536.

Rockingly engaged on the upper surface 558 of the collar 536 are a pair of opposed locking jaws 560, 562, the upper ends of which are disposed beneath a cylindrical abutment element 564 integral with the upper terminal end of the rod element 542.

Extending axially through the aperture 528 in the cap element 524 is a piston rod 566 which has secured to its upper end a connecting eye 568 and to its lower end by means of threads 570 a retaining collar 572. The collar 572 includes an outer peripheral seal 574 engageable with the bore 534 of the casing 518 for maintaining fluid thereabove. The bore 534 incorporates therein sleeve elements 576 and 578 which clamp therebetween a lip seal 580. The rods 566 comprise a plurality of separable sections, the lower section 582 of which includes the threaded portion 570, and incorporates in the upper end an internally threaded recess 584 accommodating therein the lower threaded end 586 of the upper rod section 588. Threaded onto a threaded portion 590 of the upper rod section is a metering piston 592 incorporating a peripheral seal and having a transverse metering orifice 594 therethrough. A coil spring 596 is circumposed about the upper rod section 588.

*Operation*

When the parachute and cargo are discharged from an aircraft, the parts are normally disposed in the position shown in FIG. 12. The skirt 572 will be engaged about the upper ends of the locking jaws 560, 562 to prevent lateral movement as in FIG. 9 of the previously described embodiment. After a predetermined interval of time, fluid will have moved through the metering orifice 594 to permit the metering piston 592 to assume the position shown in FIG. 13. The skirt or sleeve 572 will move with the piston to permit the locking jaws 560, 562 to move apart after tension is no longer present on the separable jaws 548, 550.

During descent of the cargo, the compression spring 540 will be slightly compressed; after the cargo reaches the ground, the spring will urge the collar 556 upwardly slightly to cam the locking jaws 560, 562 outwardly from beneath the abutment cylinder 564. After this has occurred, a connecting ring which will be disposed between the separable jaws 548, 560 may have tension applied thereto, which will overcome the compression spring 540 to permit the upper ends of the jaws 548, 550 to move away from the lower peripheral skirt 532 of the cap element 526 and thus the jaws may be separated in the manner shown in FIG. 9 of the previously described embodiment.

It will be obvious to those skilled in the art that various changes may be made without departing from the spirit of the invention, and therefore the invention is not limited to what is shown in the drawings and described in the specification but is only as indicated in the appended claims.

I claim:

1. A coupling assembly comprising in combination a casing, a fluid chamber in said casing, tension-responsive, fluid-metering means disposed in said fluid chamber for movement therein during a predetermined interval of time when tension is applied thereto, jaw means in said casing, connecting means depending from one end of said casing and including a portion detachably engageable with said jaw means, and jaw-control means operatively connected to and movable with said fluid-metering means, said jaw control means having a first position lockingly engaging said jaw means for preventing the jaw means for releasing said connecting means during the initial application of tension to said fluid-metering means, said jaw-control means having a second position determined by movement of said fluid-metering means after a predetermined interval of time and application of tension to said fluid metering means to permit release of said connecting means from said jaw means.

2. The subject matter of claim 1, said connecting means comprising a separate element removable from said jaw means, said jaw control means comprising a lower skirt portion of said casing circumposed about said jaw means.

3. The structure of claim 1, said jaw means comprising a pair of juxtaposed jaw elements, said fluid metering means including a rod connected to said piston and having a lower end portion positioned between said jaw elements, said casing including a lower open end portion through which said jaw elements may move, said casing being circumposed about said jaw elements and normally retaining the same in juxtaposed relation, said rod including biasing means thereon reacting against said jaw elements and normally urging the same away from each other.

4. The combination of claim 1, said fluid metering means including a depending sleeve portion comprising said jaw-control means, said jaw means comprising a first pair of opposed laterally displaceable jaw elements normally positioned within the depending sleeve of said fluid metering means, biasing means engaging said first pair of jaw elements and normally urging the jaw elements away from each other, said connecting means comprising an elongated rod having an upper abutment portion retained by and movable relative to said jaw elements, said rod element including a lower abutment portion, and a second pair of separable jaw elements on the lower abutment portion of said rod element for detachably engaging a suspending ring or the like, said casing including a lower peripheral skirt portion circumposed about said second pair of separable jaw elements for normally retaining the same in a locked condition until a predetermined time interval has elapsed.

5. The structure of claim 4, and a compression spring circumposed about the rod element and normally retaining said second pair of jaw elements within the lower peripheral skirt of said casing, said second pair of jaw elements being manually withdrawable from said lower peripheral skirt portion for permitting separation of the same.

6. The combination of claim 1, said fluid metering means including a depending skirt portion circumposed about said jaw means, said jaw means comprising a first pair of laterally displaceable, opposed jaw elements including an upper end portion disposed within said depending piston skirt portion and normally retained against lateral movement prior to a predetermined time interval determined by movement of said fluid metering means, said connecting means comprising an elongated rod element extending between said opposed jaw elements and having an upper abutment portion engageable on said jaw elements, said rod including a lower clevis portion depending from said casing, said clevis portion including a mounting shaft, a pair of hook jaws intermediately pivoted on said shaft and including reverse-bent upper end portions extending parallel to said rod, said casing including a lower peripheral skirt portion abuttingly engageable with the upper end portions of said pair of hook jaws, and spring means circumposed about said rod and normally urging the same toward said fluid metering means and permitting manual withdrawal of the hook jaws from the peripheral skirt of said casing.

7. A coupling assembly comprising in combination a casing, tension-responsive timing means disposed in said casing for operation therein during a predetermined interval of time when tension is applied thereto, jaw means in said casing, connecting means depending from one end of said casing and including a portion detachably engageable with said jaw means, and jaw control means operatively connected to and movable during operation of said timing means, said jaw control means having a first position lockingly engaging said jaw means for preventing the jaw means from releasing said connecting means during the initial application of tension to said timing means, said jaw control means having a second position determined by operation of said timing means after a predetermined interval of time and application of tension to said timing means to permit release of said connecting means from said jaw means.

8. The combination of claim 7, said connecting means comprising a separate element removable from said jaw means, said jaw control means comprising a lower skirt portion of said casing circumposed about said jaw means.

9. The combination of claim 7, said jaw means comprising a pair of juxtaposed jaw elements, said timing means including a rod having a lower end portion positioned between said jaw elements, said casing including a lower open end portion through which said jaw elements may move, said casing being circumposed about said jaw elements and normally retaining the same in juxtaposed relation, said rod including biasing means thereon reacting against said jaw elements and normally urging the same away from each other.

10. The combination of claim 7, said timing means including a depending sleeve portion comprising said jaw control means, said jaw means comprising a first pair of opposed, laterally displaceable jaw elements normally positioned within the depending sleeve of said timing means, biasing means engaging said first pair of jaw elements and normally urging the jaw elements away from each other, said connecting means comprising an elongated rod having an upper abutment portion retained by and movable relative to said jaw elements, said rod element including a lower abutment portion, and a second pair of separable jaw elements on the lower abutment portion of said rod element for detachably engaging a suspending ring or the like, said casing including a lower peripheral skirt circumposed about said second pair of separable jaw elements for normally retaining the same in a locked condition until a predetermined time interval has elapsed.

11. The combination of claim 10, and a compression spring circumposed about the rod element and normally retaining said second pair of jaw elements within the lower peripheral skirt of said casing, said second pair of jaw elements being manually withdrawable from said lower peripheral skirt portion for permitting separation of the same.

12. The combination of claim 7, said timing means including a depending skirt portion circumposed about said jaw means, said jaw means comprising a first pair of laterally displaceable, opposed jaw elements including an upper end portion disposed within said depending skirt portion and normally retained against lateral movement prior to a predetermined time interval determined by operation of said timing means, said connecting means comprising an elongated rod element extending between said opposed jaw elements having an upper abutment portion engageable on said jaw elements, said rod including a lower clevis portion depending from said casing, said clevis portion including a mounting shaft, a pair of hook jaws intermediately pivoted on said shaft and including reverse-bent upper end portions extending parallel to said rod, said casing including a lower peripheral skirt portion abuttingly engageable with the upper end portions of said pair of hook jaws, and spring means circumposed about said rod and only urging the same toward said timing means and permitting manual withdrawal of said hook jaws from the peripheral skirt of said casing.

13. The structure of claim 7 including seal means in said casing for completely protecting said timing means disposed in said casing against moisture and other contaminants.

References Cited in the file of this patent

UNITED STATES PATENTS

| | | |
|---|---|---|
| 2,400,165 | Porter | May 14, 1946 |
| 2,732,245 | Lemoigne | Jan. 24, 1956 |
| 2,949,330 | Musser | Aug. 16, 1960 |